US012231907B2

(12) United States Patent
 Richards et al.

(10) Patent No.: US 12,231,907 B2
(45) Date of Patent: Feb. 18, 2025

(54) SELECTIVE TRANSMISSION AND/OR DETECTION OF IDENTIFICATION SIGNALS BY A WIRELESS ACCESS NODE IN UNLICENSED SPECTRUM

(71) Applicant: Telefonaktiebolaget LM Ericsson (publ), Stockholm (SE)

(72) Inventors: Christopher Richards, Ottawa (CA); Roland Smith, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 687 days.

(21) Appl. No.: 17/413,646

(22) PCT Filed: Dec. 12, 2018

(86) PCT No.: PCT/IB2018/059930
§ 371 (c)(1),
(2) Date: Jun. 14, 2021

(87) PCT Pub. No.: WO2020/121028
PCT Pub. Date: Jun. 18, 2020

(65) Prior Publication Data
US 2022/0022050 A1   Jan. 20, 2022

(51) Int. Cl.
*H04W 16/14*   (2009.01)
(52) U.S. Cl.
CPC .................. *H04W 16/14* (2013.01)
(58) Field of Classification Search
CPC .............. H04W 16/14; H04W 74/08
See application file for complete search history.

(56) References Cited

U.S. PATENT DOCUMENTS 10,506,484 B2    12/2019  Richards et al.
11,349,631 B2 *   5/2022  Cherian ............... H04L 1/1887
(Continued)

FOREIGN PATENT DOCUMENTS

WO    2018035522 A1    2/2018
WO    2019125245 A1    6/2019

OTHER PUBLICATIONS

Author Unknown, "IEEE Standard for Information technolog—Telecommunications and information exchange between systems Local and metropolitan area networks—Specific requirements; Part 11: Wireless LAN Medium Access Control (MAC) and Physical Layer (PHY) Specifications," IEEE Computer Society, IEEE Std 802.11, Mar. 29, 2012, New York, 2793 pages.
(Continued)

*Primary Examiner* — Abdullahi Ahmed
(74) *Attorney, Agent, or Firm* — Sage Patent Group

(57) ABSTRACT

Embodiments of a wireless access node for dynamically transmitting an identification signal and/or detecting identification signals from other transmit nodes when operating in unlicensed spectrum and embodiments of a method of operation thereof are disclosed. In some embodiments, a method in a wireless access node that operates in an unlicensed frequency spectrum comprises determining, based on one or more parameters, whether the wireless access node is to transmit an identification signal and/or detect identification signals from other transmit nodes. The method further comprises operating in accordance with a result of the determining whether to transmit the identification signal and/or to detect identification signals from other transmit nodes. In this manner, throughput can be improved.

24 Claims, 12 Drawing Sheets

(56) References Cited

U.S. PATENT DOCUMENTS

| | | | |
|---|---|---|---|
| 2016/0095110 A1 | 3/2016 | Li et al. | |
| 2016/0295420 A1* | 10/2016 | Luo | H04W 16/14 |
| 2018/0077725 A1* | 3/2018 | Sun | H04W 28/26 |
| 2019/0274157 A1* | 9/2019 | Yerramalli | H04L 67/146 |
| 2020/0008243 A1* | 1/2020 | Choi | H04W 74/004 |
| 2020/0112389 A1* | 4/2020 | Fakoorian | H04L 5/0055 |
| 2021/0029553 A1* | 1/2021 | Luo | H04W 16/14 |
| 2021/0289550 A1* | 9/2021 | Liu | H04W 74/0816 |

OTHER PUBLICATIONS

Author Unknown, "IEEE Standard for Information technology—Telecommunications and information exchange between systems Local and metropolitan area networks—Specific requirements; Part 11: Wireless LAN Medium Access Control (MAC) and Physical Layer (PHY) Specifications," IEEE Computer Society, IEEE Std 802.11, Dec. 14, 2016, New York, 3534 pages.

Charter Communications, "R1-1813380: Initial Signal and Coexistence," Third Generation Partnership Project (3GPP), TSG RAN WG1 Meeting #95, Nov. 12-16, 2018, 5 pages, Spokane, Washington.

International Search Report and Written Opinion mailed for International Patent Application No. PCT/IB2018/059930, mailed Jun. 27, 2019, 14 pages.

* cited by examiner

SELECTIVE TRANSMISSION AND/OR DETECTION OF IDENTIFICATION SIGNALS BY A WIRELESS ACCESS NODE IN UNLICENSED SPECTRUM

This application is a 35 U.S.C. § 371 national phase filing of International Application No. PCT/IB2018/059930, filed Dec. 12, 2018, the disclosure of which is incorporated herein by reference in its entirety.

TECHNICAL FIELD

The present disclosure relates to operation of a wireless access node in unlicensed spectrum and, in particular, to transmission and detection of identification signals by the wireless access node in the unlicensed spectrum.

BACKGROUND

Unlicensed bands offer the possibility for deployment of radio networks by non-traditional operators that do not have access to licensed spectrum, such as, e.g., building owners, industrial sites, and municipalities who want to offer a service within the operation they control. The Third Generation Partnership Project (3GPP) and MulteFire Alliance have previously specified Long Term Evolution (LTE)-based systems that operate in unlicensed spectrum; for example, License Assisted Access (LAA) in 3GPP Release (Rel) 13, Rel-14, and Rel-15. New Radio (NR) is also being designed for unlicensed spectrum operation (i.e., NR Unlicensed (NR-U)).

For a node to be allowed to transmit in unlicensed spectrum, e.g., the 5 Gigahertz (GHz) band, it typically needs to perform a Clear Channel Assessment (CCA). This procedure typically includes sensing the medium to be idle for a number of time intervals. Sensing the medium to be idle can be done in different ways, e.g., using energy detection, preamble detection, or virtual carrier sensing, where the latter implies that the node reads control information from other transmitting nodes informing when a transmission ends. After sensing the medium to be idle, a node is typically allowed to transmit for a certain amount of time, sometimes referred to as Transmission Opportunity (TXOP). The length of the TXOP depends on regional regulations and the type of CCA that has been performed, but typically ranges from 1 millisecond (ms) to 10 ms.

When operating in unlicensed spectrum, base stations (e.g., a 3GPP base station operating in accordance with LAA, MulteFire, or NR-U) and User Equipment (UE) either always transmit and detect IEEE 802.11 (also known as WiFi) preambles in order to help solve the well-known hidden (WiFi) node problem or never transmit or detect WiFi preambles. More specifically, when performing a transmission in the unlicensed spectrum, base stations and UEs either always include a WiFi preamble at the start of the transmission (i.e., a WiFi preamble is transmitted immediately prior to the LAA, MulteFire, or NR-U signal) or never include a WiFi preamble. When receiving in the unlicensed spectrum, the base stations and UEs either always attempt to decode a WiFi preamble or never attempt to decode a WiFi preamble.

SUMMARY

Systems and methods are disclosed herein that relate to a wireless access node dynamically transmitting an identification signal and/or detecting identification signals from other transmit nodes when operating in unlicensed spectrum. In some embodiments, a method in a wireless access node that operates in an unlicensed frequency spectrum comprises determining, based on one or more parameters, whether the wireless access node is to transmit an identification signal and/or detect identification signals from other transmit nodes. The method further comprises operating in accordance with a result of the determining whether to transmit the identification signal and/or to detect identification signals from other transmit nodes. In this manner, throughput can be improved.

In some embodiments, the identification signal comprises at least a portion of a WiFi preamble. In some embodiments, the WiFi preamble is a WiFi preamble for a non-High Throughput (HT) Physical Layer Convergence Procedure (PLCP) Protocol Data Unit (PPDU) wherein the WiFi preamble comprises Legacy Short Training Field (L-STF), Legacy Long Training Field (L-LTF), and Legacy Signaling Field (L-SIG), a WiFi preamble for a HT-mixed format PPDU wherein the WiFi preamble comprises L-STF, L-LTF, L-SIG, HT Signaling Field (HT-SIG), HT Short Training Field (HT-STF), and one or more HT Long Training Fields (HT-LTFs), a WiFi preamble for a Greenfield format PPDU wherein the WiFi preamble comprises a HT Greenfield Short Training Field (HT-GF-STF), a HT-LFT1, a HT-SIG, and one or more HT-LTFs, or a WiFi preamble comprising a Very HT Short Training Field (VHT-STF). In some other embodiments, the at least a portion of the WiFi preamble comprises a L-STF, a L-LTF, a L-SIG, a HT-SIG, a HT-STF, a HT-LTF, a HT-GF-STF, a HT-LFT1 field, and/or a VHT-STF.

In some embodiments, the one or more parameters are adjustable.

In some embodiments, the one or more parameters comprise one or more link parameters for a wireless link between the wireless access node and another wireless access node. Further, in some embodiments, the wireless access node is a cellular base station, the other wireless access node is a User Equipment (UE) served by the cellular base station, and the one or more link parameters comprise a UE configured uplink power for the UE. In some other embodiments, the one or more link parameters comprise a configured transmit power for the wireless access node or the other wireless access node for the wireless link. In some embodiments, the one or more link parameters comprise a threshold of a Reference Signal Received Quality (RSRQ) indicating a Bit Error Rate (BER) of a received signal at the other wireless access node from the wireless access node.

In some embodiments, the one or more parameters comprise one or more parameters related to a radio frequency channel environment sensed by the wireless access node or another wireless access node that wirelessly communicates with the wireless access node. Further, in some embodiments, the one or more parameters related to the radio frequency channel environment comprise channel load, Signal to Interference plus Noise Ratio (SINR) or Signal to Interference Ratio (SIR) reported by the other wireless access node to the wireless access node for a wireless link between the wireless access node and the other wireless access node, Hybrid Automatic Repeat Request (HARQ) retransmission ratio of transmissions, Channel Quality Indication (CQI), a noise floor, a Clear Channel Assessment (CCA) success ratio, and/or an estimated number of unique transmitting nodes for which the identification signals can be detected by the wireless access node. Further, in some embodiments, the channel load is computed based on Received Signal Strength Indicator (RSSI) measurements or Received Signal Reference Power (RSRP) measurements performed by the other wireless access node and reported to the wireless access node.

In some embodiments, determining whether the wireless access node is to transmit the identification signal and/or detect the identification signals from the other transmit nodes comprises determining, based on the one or more parameters, whether the wireless access node is to transmit the identification signal during a first time period and/or detect the identification signals from the other transmit nodes during the first time period. Operating in accordance with the result of the determining comprises operating in accordance with the result of the determining during the first time period. The method further comprises determining, based on the one or more parameters, whether the wireless access node is to transmit the identification signal during a second time period and/or detect the identification signals from the other transmit nodes during the second time period and, during the second time period, operating in accordance with a result of the determining whether the wireless access node is to transmit the identification signal during the second time period and/or detect the identification signals from the other transmit nodes during the second time period.

In some embodiments, determining whether the wireless access node is to transmit the identification signal and/or detect the identification signals from the other transmit nodes comprises determining whether the wireless access node is to transmit the identification signal based on the one or more parameters. Further, in some embodiments, determining whether the wireless access node is to transmit the identification signal based on the one or more parameters comprises determining that the wireless access node is not to transmit the identification signal based on the one or more parameters. Further, in some embodiments, operating in accordance with the result of the determining comprises refraining from transmitting the identification signal upon determining that the wireless access node is not to transmit the identification signal based on the one or more parameters. In some other embodiments, the wireless access node is a wireless access point, and determining whether the wireless access node is to transmit the identification signal based on the one or more parameters comprises determining, for each wireless device of a plurality of wireless devices served by the wireless access point, whether it is desirable for the wireless access point to transmit the identification signal prior to transmissions to the wireless device based on one or more parameters related to the wireless device. Determining whether the wireless access node is to transmit the identification signal based on the one or more parameters further comprises, for a transmit time interval during which transmissions to a subset of the plurality of wireless devices are scheduled to be transmitted, determining to not transmit the identification signal prior to transmitting the transmissions to the subset of the plurality of wireless devices if it has been determined that it is desirable for the wireless access point to not transmit the identification signal prior to transmissions to all wireless devices in the subset and determining to transmit the identification signal prior to transmitting the transmissions to the subset of the plurality of wireless devices if it has been determined that it is desirable for the wireless access point to transmit the identification signal prior to transmissions to any wireless device in the subset. In some other embodiments, the wireless access node is a wireless access point, and determining whether the wireless access point is to transmit the identification signal based on the one or more parameters comprises: determining, for each wireless device of a plurality of wireless devices served by the wireless access point, whether it is desirable for the wireless access point to transmit the identification signal prior to transmissions to the wireless device based on one or more parameters related to the wireless device; grouping the plurality of wireless devices into a first group for which it is desirable to transmit the identification signal and a second group for which it is desirable not to transmit the identification signal; scheduling first transmissions to wireless devices from only the first group during a first transmission time interval such that a determination is made to transmit the identification signal prior to the first transmissions; and scheduling second transmissions to wireless devices from only the second group during a second transmission time interval such that a determination is made to not transmit the identification signal prior to the second transmissions.

In some embodiments, determining whether the wireless access node is to transmit the identification signal and/or detect the identification signals from the other transmit nodes comprises determining whether the wireless access node is to detect the identification signals from the other transmit nodes based on the one or more parameters. Further, in some embodiments, determining whether the wireless access node is to detect the identification signals from the other transmit nodes based on the one or more parameters comprises determining that the wireless access node is not to detect the identification signals from the other transmit nodes based on the one or more parameters.

In some embodiments, the wireless access node is a cellular base station. Further, in some embodiments, the cellular base station is a Third Generation Partnership Project (3GPP) base station. In some embodiments, the method further comprises sending, to a wireless device, an indication that the wireless device is not to transmit the identification signal prior to at least one subsequent transmission by the wireless device.

In some embodiments, the wireless access node is a WiFi access point.

Embodiments of a wireless access node are also disclosed. In some embodiments, a wireless access node that operates in an unlicensed frequency spectrum comprises at least one radio unit and processing circuitry associated with the at least one radio unit. The processing circuitry is configured to cause the wireless access node to determine, based on one or more parameters, whether the wireless access node is to transmit an identification signal and/or detect identification signals from other transmit nodes, operate in accordance with a result of the determining.

In some embodiments, the wireless access node is a cellular base station, and the at least one radio unit comprises a first radio unit for wireless communication in a cellular communications network and a second radio unit for another radio access technology that is configured to transmit the identification signal for the other radio access technology and/or detect identification signals for the other radio access technology in accordance with the result of the determining.

In some embodiments, the wireless access point is a cellular base station, and the at least one radio unit comprises a single radio unit for both wireless communication for a cellular communications network and wireless communication for another radio access technology, the single radio unit being configured to transmit the identification signal for the other radio access technology and/or detect identification signals for the other radio access technology in accordance with the result of the determining.

In some embodiments, the other radio access technology is WiFi.

In some embodiments, the cellular communications network is a Third Generation Partnership Project (3GPP) cellular communications network.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
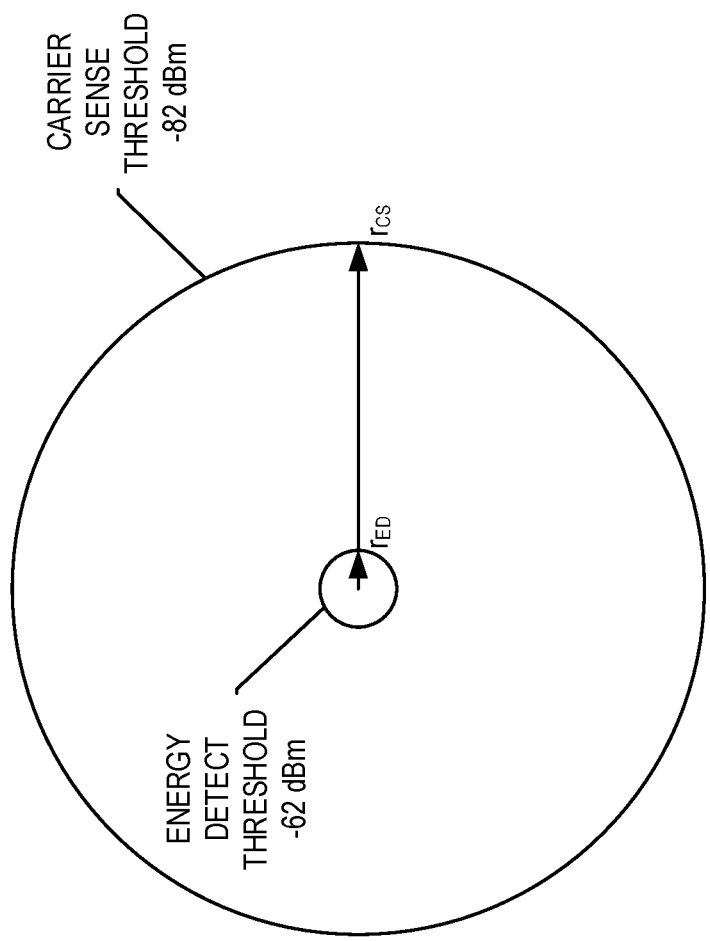
FIG. 1 illustrates a theoretical 10× radius increase in cell size for line-of-sight propagation when using Clear Channel Assessment (CCA) based on a carrier sense threshold as compared to CCA based on an energy detection threshold.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Cellular Network Node: As used herein, a "cellular network node" is any node that is either part of the radio access network or the core network of a cellular communications network/system.

Wireless Access Point: As used herein, a "wireless access point" is a general term referring to any type of wireless device that provides radio access in accordance with a radio access technology such as, e.g., a Wireless Local Area Network (WLAN) Access Point (AP) such as, e.g., an IEEE 802.11 AP; a 3GPP radio access node such as, e.g., a 3GPP base station (e.g., a Universal Terrestrial Radio Access Network (UTRAN) AP, a 5G NR base station which is referred to as a gNB, an eNB, a base station serving a macro cell, a base station serving a micro cell, a base station serving a pico cell, or a base station serving a femto cell), radio equipment, relay, radio unit, or Machine Type Communication (MTC) server; or a wireless access device providing peer-to-peer radio access.

Wireless Access Device: As used herein, a "wireless access device" is a general term referring to any type of device that accesses a radio access technology such as, e.g., a IEEE 802.11 Station (STA), a 3GPP User Equipment (UE), a mobile station, a mobile terminal, a MTC device or MTC UE, a multimode terminal, a user access or user network access device, or a WLAN UE.

Wireless Access Node: As used herein, a "wireless access node" is a general term that refers to either a wireless access point or a wireless access device.

Identification Signal: As used herein, an "identification signal" is any signal transmitted by a wireless access node that identifies the respective transmission as a transmission using a particular radio access technology. An example of an identification signal is a WiFi preamble. Another example of an identification signal is a portion of a WiFi preamble (e.g., one or more fields of a WiFi preamble) that make the identification signal appear to be a WiFi preamble. The identification signal may be a preamble, but is not limited thereto. For example, the identification signal may be a preamble (i.e., located at a start of a transmission), a mid-amble (i.e., located at some point within a transmission), or a post-amble (i.e., located at the end of a transmission).

When operating in unlicensed spectrum, base stations (e.g., a 3GPP base station operating in accordance with LAA, MulteFire, or NR Unlicensed (NR-U)) either always transmit and detect IEEE 802.11 (also known as WiFi) preambles or never transmit or detect WiFi preambles. Always transmitting WiFi preambles helps to solve the well-known hidden (WiFi) node problem, but does so at the expense of reduced spectrum efficiency, i.e., transmitting WiFi preambles triggers time division multiplexing of the channel by other co-channel nodes at signal levels of about 20 decibels (dB) lower than it would otherwise have been, thereby limiting the benefits of frequency reuse by neighboring co-channel nodes. Always detecting WiFi preambles to determine if the channel is free or busy also triggers time division multiplexing of the channel by the detecting node at signal levels of about 20 dB lower than it would otherwise have been, with the same loss of spectral efficiency. Further, the use of WiFi preambles (transmitted and detected) reduces the frequency reuse size of a base station by about 20 dB.

Simulations have shown that, in many scenarios, the combined system throughput of the collocated networks is reduced when base stations always transmit and always detect WiFi preambles, since now the collocated, co-channel nodes must access the channel in series, i.e. time division multiplexed for their transmissions. However, there are some scenarios where the use of WiFi preambles can have a positive effect for some radio links some of the times, e.g. heavily loaded channels with many transmitting nodes that receive each other's transmissions between −82 decibel-milliwatts (dBm) and −62 dBm. Current base stations and WiFi APs either always transmit and detect WiFi preambles or never transmit or detect WiFi preambles. The decision is not dynamic and is not based on the type of technology used and/or product capabilities.

Systems and methods are disclosed herein in which a wireless access node that operates in unlicensed spectrum dynamically determines whether to transmit an identification signal and/or detect identification signals. In many of the example embodiments described herein, the wireless access node is wireless AP and, in particular, a cellular base station (e.g., a 3GPP radio base station such as, e.g., a LAA eNB or radio transceiver, MulteFire access point, or a NR-U gNB) operating in unlicensed spectrum, and the identification signals are WiFi preambles or portions of WiFi preambles. Against this backdrop, while WiFi devices rely on WiFi preamble reception and carrier sensing (i.e., Physical Layer Convergence Procedure (PLCP) preamble reception for clock recovery and SIGNAL field (which contains RATE and LENGTH information plus additional reserved bits)+ carrier sense to determine the length of the transmission), the WiFi preamble is not needed to perform the same function in LTE based systems or NR systems but are nevertheless employed to signal to nearby WiFi devices. In accordance with embodiments of the present disclosure, the WiFi preamble is considered optional and, therefore, the WiFi preamble (or some portion thereof) can be dynamically (i.e., selectively) transmitted and/or detected, e.g., by a cellular base station based on one or more parameters. The one or more parameters can include one or more link parameters and/or one or more parameters related to the Radio Frequency (RF) environment. In this manner, the cellular base station may transmit a WiFi preamble and/or detect WiFi preambles from other transmit nodes when doing so would be beneficial and otherwise refrain from transmitting a WiFi preamble and/or detecting WiFi preambles from other transmit nodes.

Again, in many of the example embodiments described herein, the wireless access node is a wireless AP and, in particular, a cellular base station (e.g., a 3GPP radio base station such as, e.g., a License Assisted Access (LAA) eNB or radio transceiver, MulteFire access point, or a NR-U gNB) operating in unlicensed spectrum; however, the embodiments described herein are equally applicable to other types of wireless access nodes (e.g., cellular wireless devices (e.g., 3GPP UEs), WiFi APs, and/or WiFi STAs). Further, in many of the embodiments described herein, the identification signal(s) is(are) a WiFi preamble(s) or a portion(s) of a WiFi preamble(s); but the present disclosure is not limited thereto.

In some embodiments, a cellular base station operating in unlicensed spectrum determines whether to transmit an identification signal (e.g., a WiFi preamble or portion thereof) and/or detect identification signals (e.g., WiFi preambles or portions thereof) based on one or more per wireless device (e.g., per UE) link parameters (e.g., wireless device configured uplink power) and/or one or more per wireless device (e.g., per UE) parameters related to the RF environment sensed by the cellular base station and/or the wireless device (e.g., radio condition measurements and/or reports). Some examples include a measurement or report of a Signal to Interference plus Noise Ratio (SINR) of a wireless link (e.g., uplink or downlink) between the cellular base station and the wireless device, a measurement or report of a throughput of the wireless link, a measurement or report of a number of Hybrid Automatic Repeat Request (HARQ) retransmissions (e.g., on average) needed to successfully decode a transmission over the wireless link, a Channel Quality Indication (CQI) report from the wireless device, a measurement or report of a noise floor measurement(s) for the wireless link, a report of Reference Signal Received Power (RSRP) at the wireless device, and/or a measurement or report of Received Signal Strength Indicator (RSSI) for the wireless link. As an example, a cellular base station operating in unlicensed spectrum can determine to transmit a WiFi preamble before each transmission in which a particular wireless device is scheduled to receive control or user data if the channel conditions for the downlink from the cellular base station to the wireless device are poor (e.g., high noise floor, low SINR, high number of HARQ retransmissions, and/or the like). Conversely, if the channel conditions are good, the cellular base station can determine to not transmit a WiFi preamble before each transmission in which that particular wireless device is scheduled to receive control or user data.

In some embodiments, the cellular base station can also schedule two or more wireless devices experiencing similar radio conditions into the same transmit opportunity (also referred to herein as a transmit time interval) such that the transmission or not of WiFi preambles benefits multiple wireless devices. In other words, the cellular base station can group wireless devices into a first group of wireless devices that will benefit from the cellular base station transmitting WiFi preambles and a second group of wireless devices that benefit from the cellular base station not transmitting WiFi preambles. The cellular base station can then schedule wireless devices from the same group in the same transmission time intervals. In some embodiments, the groups are dynamically updated, e.g., each time a measurement(s) or report(s) is obtained for a wireless device.

In some embodiments, the cellular base station determines whether to transmit and/or detect identification signals (e.g., WiFi preambles) based on the type of data being transmitted by the base station (e.g., control information such as a Demodulation Reference Signal (DMRS) (broadcast beacon of the system) or HARQ feedback (Acknowledgement (ACK) or Negative Acknowledgement (NACK))). In some embodiments, the cellular base station determines whether to transmit and/or detect identification signals (e.g., WiFi preambles) based on per wireless device (e.g., per UE) radio condition measurements and/or reports as well as the type of data being transmitted by the base station.

In some embodiments, the cellular base station determines whether to transmit and/or detect identification signals (e.g., WiFi preambles) before performing its Listen-Before-Talk (LBT) process in order to access the channel.

In some embodiments, the cellular base station determines whether to transmit and/or detect identification signals (e.g., WiFi preambles) additionally or alternatively based on its recent LBT success rate.

In some embodiments, the cellular base station enables and disables transmission and/or detection of identification signals (e.g., WiFi preambles) in order to maximize throughput.

To understand the advantages of the proposed dynamic solution, one must first understand the advantages of the current static solution as well as the limitations of such a solution. Channel contention in unlicensed bands is defined using two techniques:

1. Energy Detection Threshold: An energy detection threshold, defined according to the bandwidth of the signal, is used to assess channel availability and is set to −62 dBm for a 20 megahertz (MHz) wide channel, −59 dBm for a 40 MHz channel, and in general −62 dBm+10*log(Channel Bandwidth (BW)/20). This is defined in IEEE 802.11 specifications and European Telecommunications Standards Institute (ETSI) 5 gigahertz (GHz) regulations. This technique has the advantage of being protocol agnostic, and simply measures all received energy to assess channel availability.
2. Carrier Sense Detection Threshold: The detection of WiFi carrier sense, which includes the combination of PLCP preamble, SIG, and NAV detection is specified in 802.11 to occur at a sensitivity of at least −82 dBm, enabling devices to reserve the channel during their transmissions and expected acknowledgement. This technique is employed by 802.11 WiFi devices and some non-WiFi devices to operate with a common threshold with WiFi devices.

These two techniques differ by a minimum of 20 dB, which is the difference between the −62 dBm energy detection threshold and the −82 dBm carrier sense threshold. It is important to note that the −82 dBm carrier sense threshold is a minimum specification, while most receivers can accurately detect carrier sense signals to a cabled sensitivity of −90 dBm at 5 GHz and −96 dBm at 2.4 GHz. Measured over the air carrier sense sensitivity is 8-12 dB higher than cabled, and typically 10 dB higher. Therefore, in practical terms, the carrier sense threshold is typically −82 dBm for over the air transmissions, while the energy detection threshold remains at −62 dBm.

As illustrated in FIG. 1, this 20 dB difference yields a theoretical 10× radius increase in cell size for line-of-sight propagation and therefore has a significant effect on how carrier sense and energy detect impact cell size. The cell which has a radius of $r_{ED}$ limited by the energy detection threshold is 10× less and 100× smaller area than a cell which has a radius of $r_{cs}$ limited by the carrier sense threshold. This comparison is only valid under conditions of fixed transmit power and receive sensitivity for all devices within the coverage area. WiFi mobile client devices come from similar chipsets, and typically have low transmitter "Root Mean Square (RMS)" dBm power in the +12 dBm range, so that the energy detection threshold is limited to approximately 20 meters (m) for −2 dB relative to isotropic (dBi) antenna gains. This is not the case with 3GPP UEs which have high transmitter RMS dBm power of +23 dBm, and the eNB radios have even higher power still, as much as +36 dBm. This difference in transmit power between traditional WiFi devices operating in these unlicensed bands, and new 3GPP devices such as LTE LAA change the dynamics of channel sharing.

While WiFi is targeted at small indoor cells in the range of 20 m to 40 m, LTE pico and micro cells have much larger coverage areas of hundreds of meters. These systems have the added benefit that they adjust upstream UE signal power to achieve a minimum SINR. The minimum levels are set by operator configured Physical Uplink Shared Channel (PUSCH) (pZeroNominalPUSCH) and Physical Uplink Control Channel (PUCCH) (pZeroNominalPUCCH) values.

Figure 2:
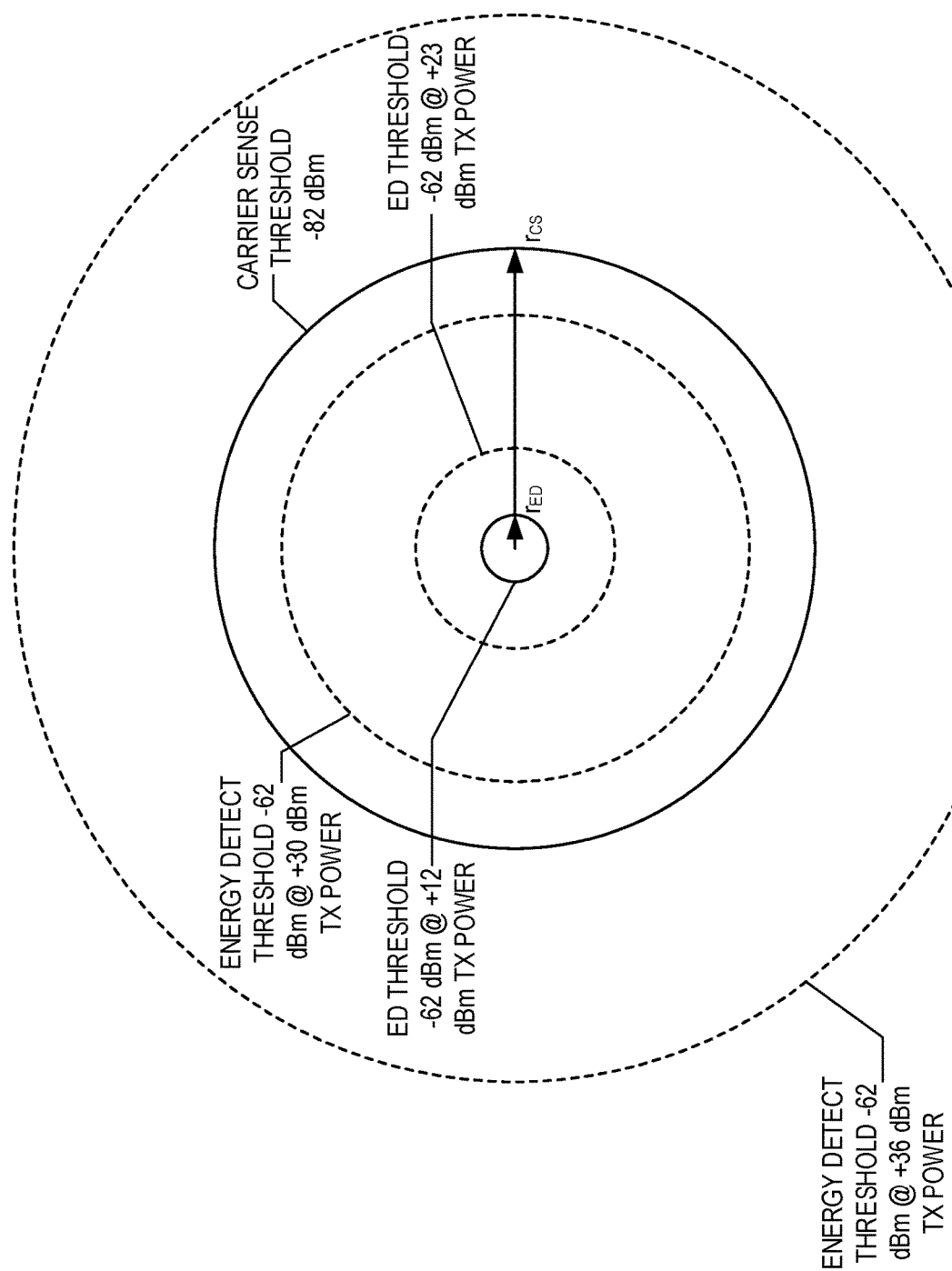
FIG. 2 illustrates cell sizes when using CCA based on carrier sense and energy detection when considering varying transmit power levels.

Assuming UEs are configured to transmit at +23 dBm power, the relative cell sizes of the 3GPP devices, as seen by WiFi devices following a −62 dBm energy detection threshold is as shown in FIG. 2. It becomes clear that the cell size for a high powered+36 dBm micro Base Transceiver Station (BTS) achieves a greater Line of Sight (LoS) reach with UEs following a −62 dBm energy detection threshold than typical WiFi APs achieve following the carrier sense threshold of −82 dBm, which includes 10 dB of fade margin. Sending additional PLCP preamble+SIG+carrier sense fields is therefore not expected to provide significant benefits. Pico cells, with +30 dBm transmit power will have comparable 80% reach of WiFi sending carrier sense. 3GPP UEs with +23 dBm transmit power achieve approximately 35% of the reach of WiFi carrier sense.

These calculations show how device transmit power is an important factor in assessing whether energy detection alone is sufficient, or if devices should additionally send carrier sense. These calculations assume LoS pathloss and a thermal noise floor with no added interference and are therefore an ideal approximation. Regardless, the present disclosure describes embodiments in which, e.g., non-WiFi devices (e.g., cellular base stations operating in unlicensed spectrum) dynamically transmit or do not transmit (and/or detect or do not detect) a WiFi preamble or portion thereof (e.g., PLCP preamble+SIG+carrier sense). Whereas WiFi devices require transmission and detection of the WiFi preamble (e.g., PLCP preamble+SIG+carrier sense) to operate, non-WiFi devices use these fields only to mitigate interference. Embodiments of the present disclosure describe the dynamic use of these fields.

More specifically, embodiments are described herein in which a wireless access node operating in unlicensed spectrum dynamically determines whether it is to transmit an identification signal (e.g., prior to performing its LBT procedure for an upcoming transmission) and/or whether it is to detect identification signals from other transmit nodes (e.g., when performing its LBT procedure). While the wireless access node can in general be any type of wireless access node such as, e.g., a non-WiFi AP or even a WiFi AP, the example embodiments described below focus on a cellular base station operating in an unlicensed spectrum. Note, however, that these embodiments are equally applicable to wireless access nodes other than cellular base stations. Further, in the example embodiments described below, the identification signal(s) is a WiFi preamble(s) or a portion of a WiFi preamble. Note, however, that the identification signal(s) can be any type of signal used for identification of a transmission of a wireless access node operating in accordance with any type of radio access technology in the unlicensed spectrum. Further, the identification signal may be a preamble, but is not limited thereto. For example, the identification signal may be a preamble (i.e., located at a start of a transmission), a mid-amble (i.e., located at some point within a transmission), or a post-amble (i.e., located at the end of a transmission).

Figure 3:
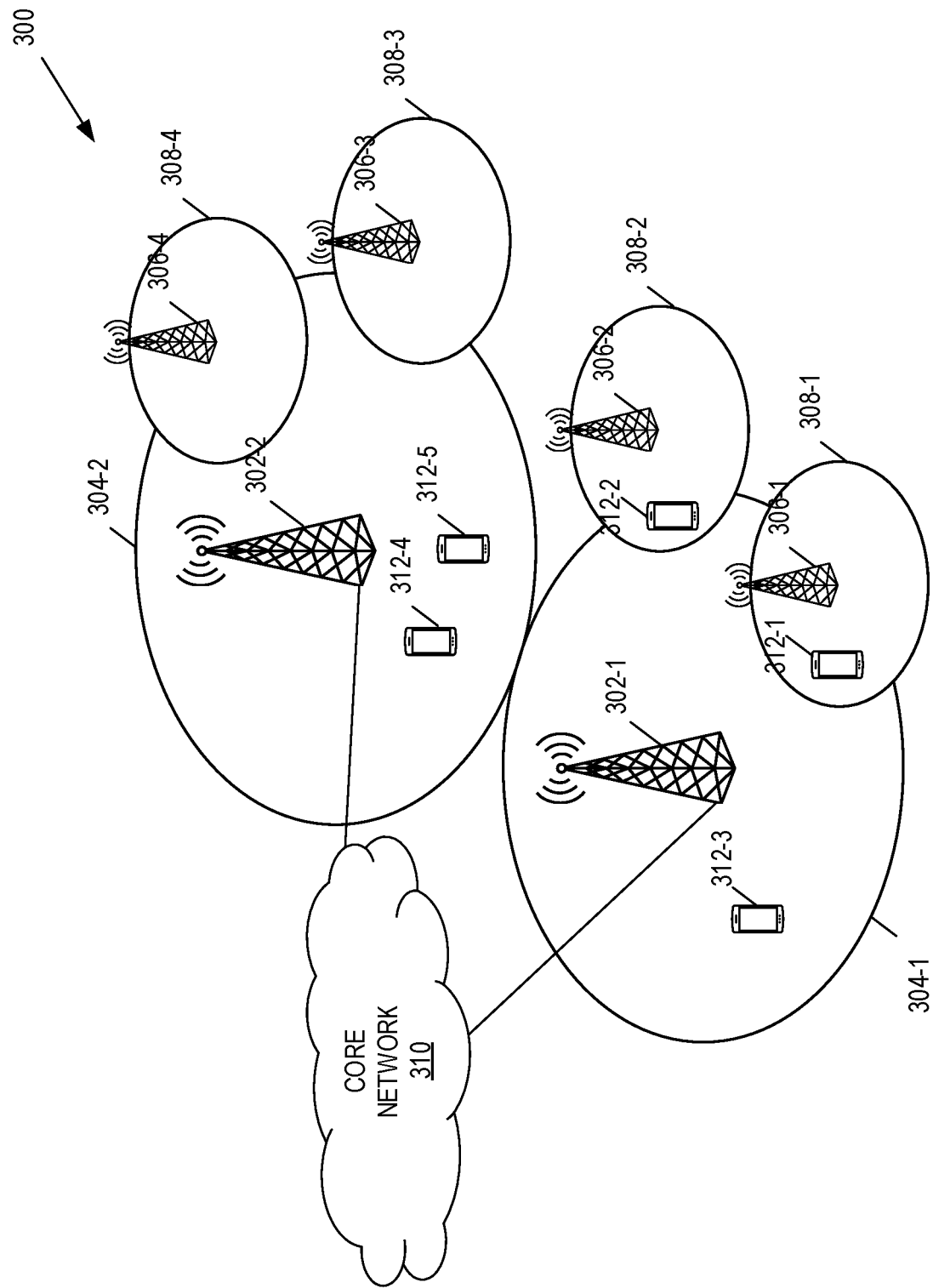
FIG. 3 illustrates one example of a cellular communications network according to some embodiments of the present disclosure.

Now, some example embodiments of the present disclosure will be described in which a cellular base station dynamically decides whether to transmit and/or detect WiFi preambles when operating in unlicensed spectrum. In this regard, FIG. 3 illustrates one example of a cellular communications system 300 in which embodiments of the present disclosure may be implemented. In the embodiments described herein, the cellular communications system 300 is a 3GPP system such as, e.g., an LTE base system or a 5G System (5GS). In this example, the cellular communications network 300 includes base stations 302-1 and 302-2, which in LTE are referred to as eNBs and in 5G NR are referred to as gNBs, controlling corresponding macro cells 304-1 and 304-2. The base stations 302-1 and 302-2 are generally referred to herein collectively as base stations 302 and individually as base station 302. Likewise, the macro cells 304-1 and 304-2 are generally referred to herein collectively as macro cells 304 and individually as macro cell 304. The cellular communications network 300 may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The base stations 302 (and optionally the low power nodes 306) are connected to a core network 310.

The base stations 302 and the low power nodes 306 provide service to wireless devices 312-1 through 312-5 in the corresponding cells 304 and 308. The wireless devices 312-1 through 312-5 are generally referred to herein collectively as wireless devices 312 and individually as wireless device 312. The wireless devices 312 are also sometimes referred to herein as UEs.

In the embodiments described herein, at least some of the base stations 302 and/or at least some of the low power nodes 306 (which are also referred to herein as base stations or low power base stations) operate in the unlicensed spectrum in accordance with, e.g., LAA, MulteFire, or NR-U. As described below, a base station 302 or low power node 306 operating in the unlicensed spectrum dynamically decides whether to transmit a WiFi preamble (or portion thereof) and/or detect WiFi preambles (or portions thereof) in the unlicensed spectrum.

Figure 4:
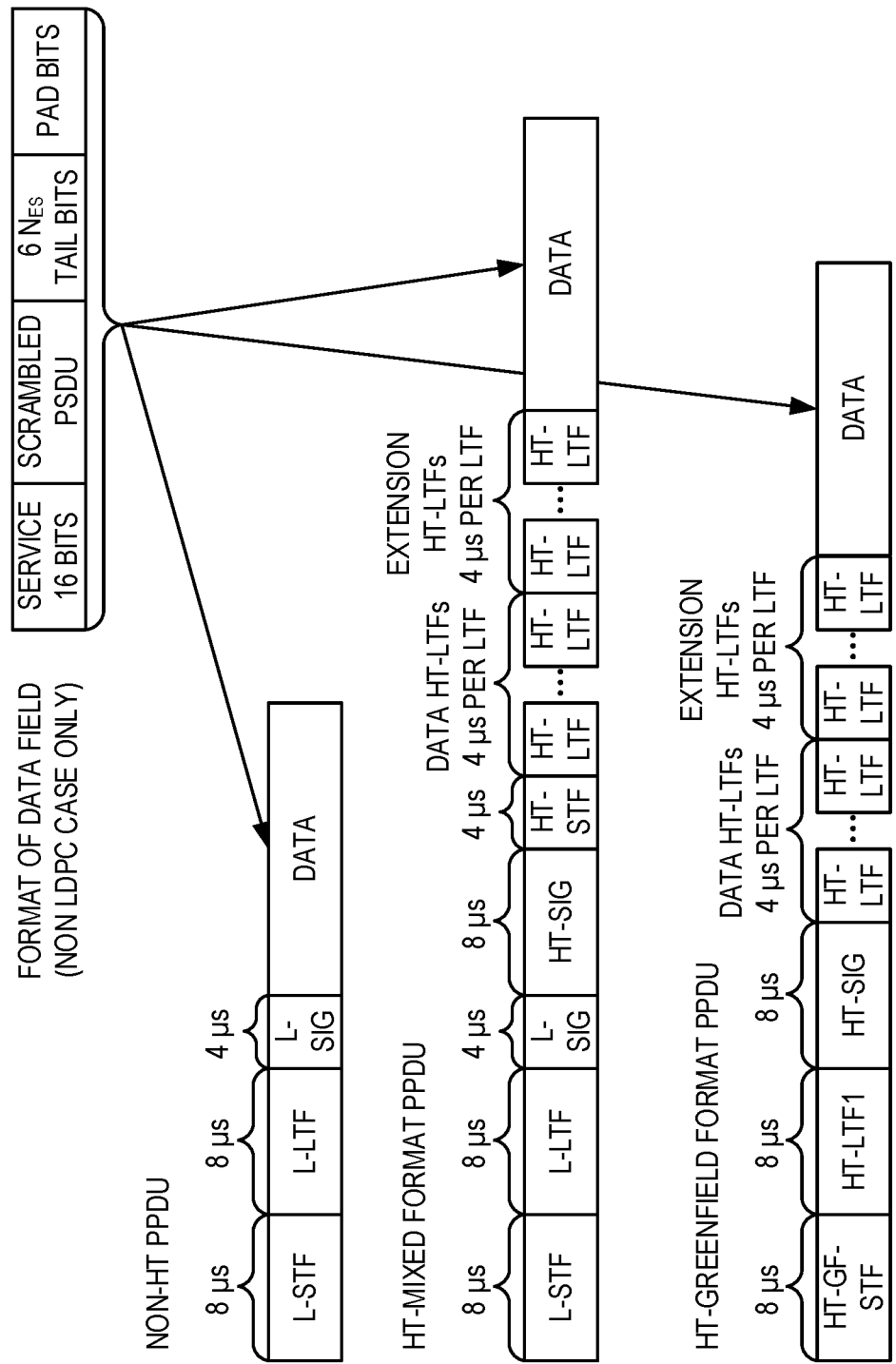
FIG. 4 illustrates some existing types of WiFi preambles.

In this regard, FIG. 4 illustrates details regarding at least some of the existing types of WiFi preambles. In particular, FIG. 4 illustrates:

Legacy WiFi Preamble (top): A legacy WiFi preamble is transmitted in what is referred to as a non-High Throughput (HT) PLOP Protocol Date Unit (PPDU), where the legacy WiFi preamble includes a Legacy Short Training Field (L-STF), a Legacy Long Training Field (L-LTF), and a Legacy Signaling Field (L-SIG). Note that, as used herein, the legacy WiFi preamble includes the L-STF, the L-LTF, and the L-SIG. Thus, the WiFi preamble is to be distinguished from the PLOP preamble, which includes only the L-STF and the L-LTF. The L-STF is 8 microseconds (μs) in length and is used for signal detection, Automatic Gain Control (AGC), and diversity selection, as well as coarse frequency offset estimation, and timing synchronization. The L-LTF is 8 μs and is used for fine frequency offset estimation. The L-SIG is 4 is long and is used to configure the RATE and LENGTH fields defining the Orthogonal Frequency Division Multiplexing (OFDM) symbol modulation rate of the transmitted data, and to detail the LENGTH of this data as a byte count. Note that the RATE and LENGTH fields of the PLOP header are encoded by a convolutional code at a rate of R=1/2 and are subsequently mapped onto a single Binary Phase Shift Keying (BPSK) encoded OFDM symbol, denoted as the SIGNAL symbol.

HT Mixed Format WiFi Preamble (middle): A HT mixed format WiFi preamble is transmitted in what is referred to as a HT-Mixed Format PPDU, where the WiFi preamble includes a L-STF, a L-LTF, a L-SIG, a HT Signaling Field (HT-SIG), a HT Short Training Field (HT-STF), and a number of HT Long Training Fields (HT-LTFs). The details of each of these fields are well-known by those of skill in the art and, as such, are not repeated here. Note that, as used herein, the HT mixed format WiFi preamble includes the L-STF, the L-LTF, the L-SIG, the HT-SIG, the HT-STF, and the HT-LTF(s). Thus, the WiFi preamble is to be distinguished from the PLOP preamble.

A HT-Greenfield (HT-GF) Format WiFi Preamble (bottom): A HT-GF format WiFi preamble is transmitted in what is referred to as a HT-GF Format PPDU, where the WiFi preamble includes a HT-GF Short Training Field (HT-GF-STF), a High-Throughput Long Training Field 1 (HT-LTF1), a HT-SIG, and a number of HT-LTFs. The details of each of these fields are well-known by those of skill in the art and, as such, are not repeated here. Note that, as used herein, the HT-GF mixed format WiFi preamble includes the HT-GF-STF, the HT-LTF1, the HT-SIG, and the HT-LTF(s). Thus, the WiFi preamble is to be distinguished from the PLOP preamble.

Figure 5:
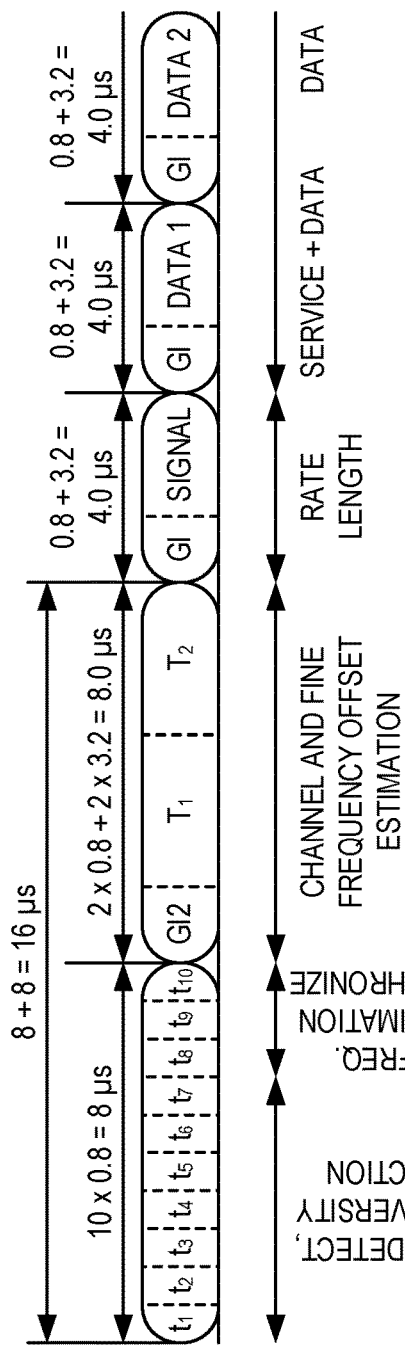
FIG. 5 illustrates the details of the Legacy Short Training Field (L-STF) and Legacy Long Training Field (L-LTF) of FIG. 4.
Figure 6:
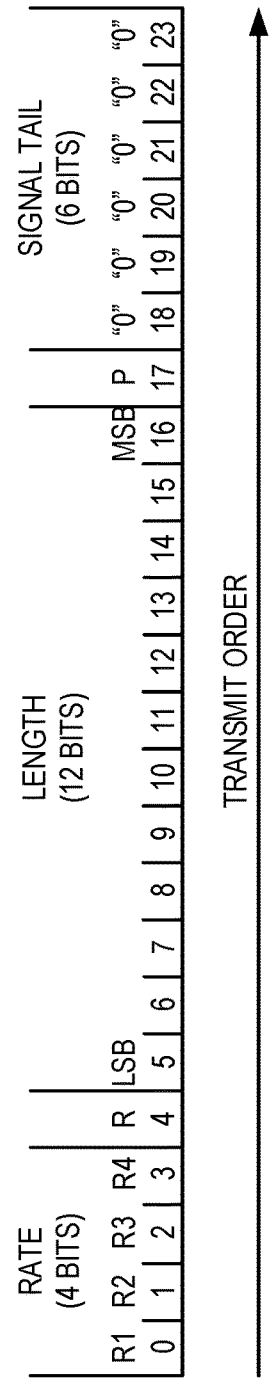
FIG. 6 illustrates the SIGNAL field bit assignment, where the SIGNAL field includes a RATE field, a LENGTH field, and a reserved (R) field.

While not necessary for the understanding of embodiments of the present disclosure, the details of the L-STF and L-LTF are shown in FIG. 5, plus the SIG field containing RATE and LENGTH. In addition to RATE, R (a reserved bit), LENGTH, and Parity, six "0" tail bits are inserted as illustrated in FIG. 6. The SIGNAL field is encoded into an OFDM symbol following the 802.11 defined steps for convolutional encoding, interleaving, BPSK modulation, pilot insertion, Fourier transform, and prepending a Global Identifier (GI) as described subsequently for data transmission with BPSK-OFDM modulated at coding rate 1/2. The contents of the SIGNAL field are not scrambled.

Figure 7:
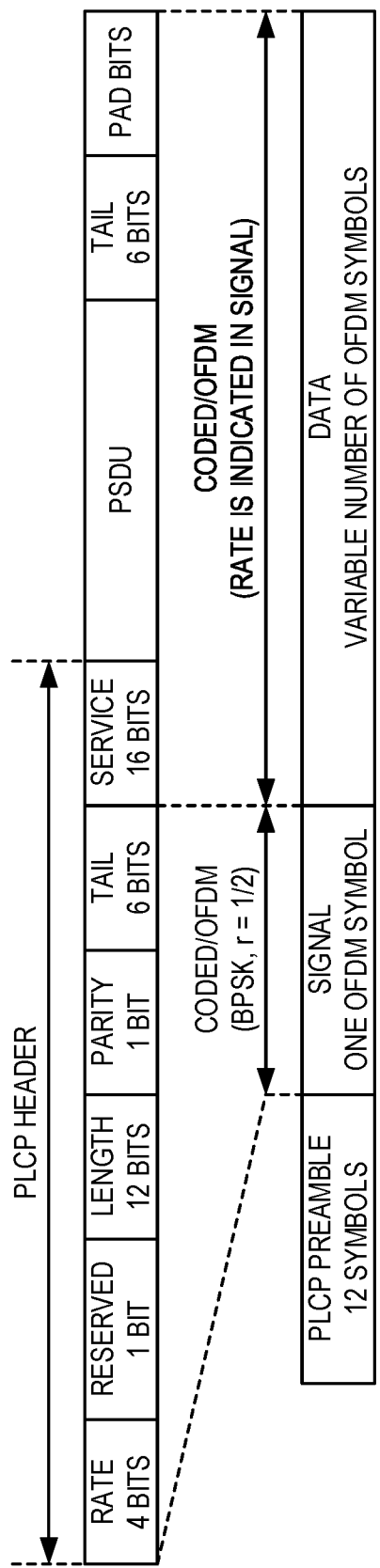
FIG. 7 illustrates the Physical Layer Convergence Procedure (PLCP) header used in, e.g., the Long Term Evolution (LTE) License Assisted Access (LAA) frame.

The PLOP Header used in, e.g., the LTE LAA frame is shown in FIG. 7.

Figure 8:
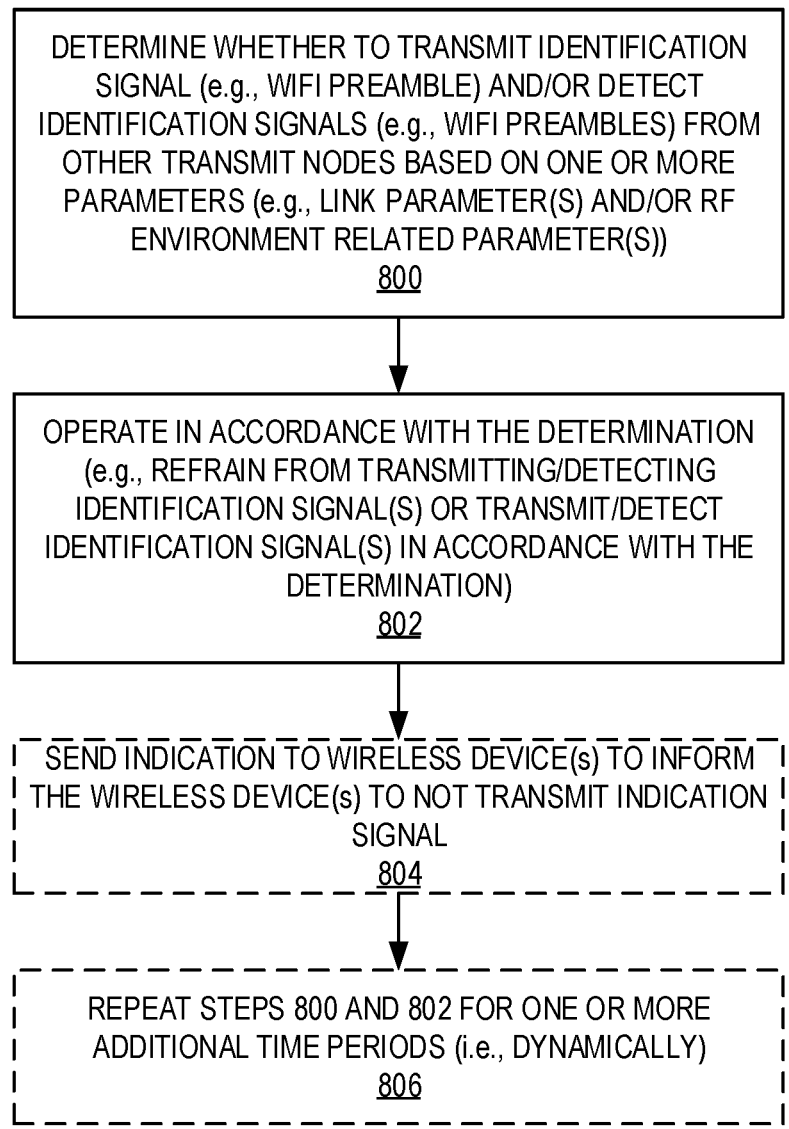
FIG. 8 is a flow chart that illustrates the operation of a wireless access point (e.g., a cellular base station) to dynamically transmit and/or detect an identification signal in unlicensed spectrum in accordance with some embodiments of the present disclosure.
Figure 9:
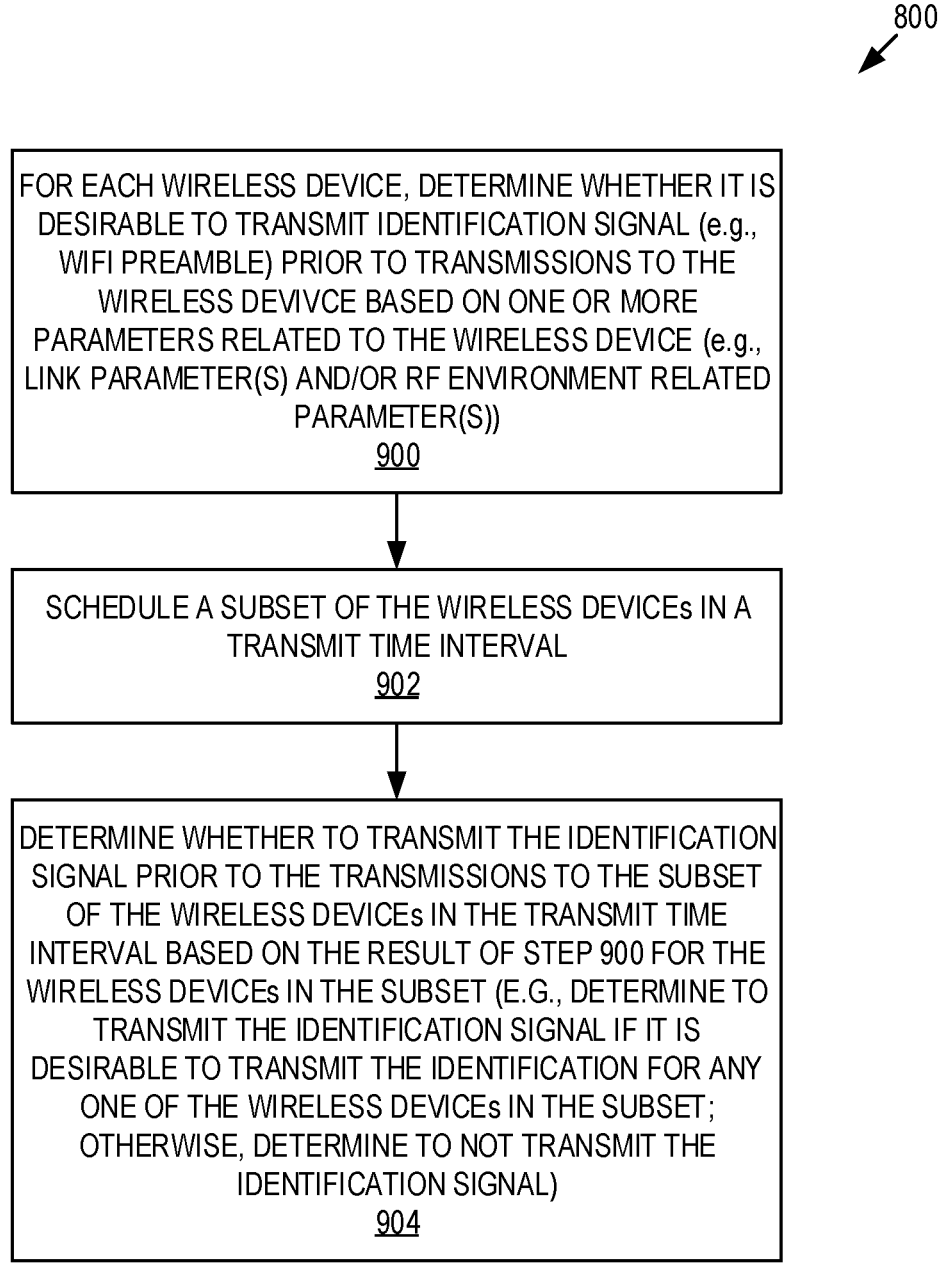
FIG. 9 illustrates one example of step 800 of FIG. 8.
Figure 10:
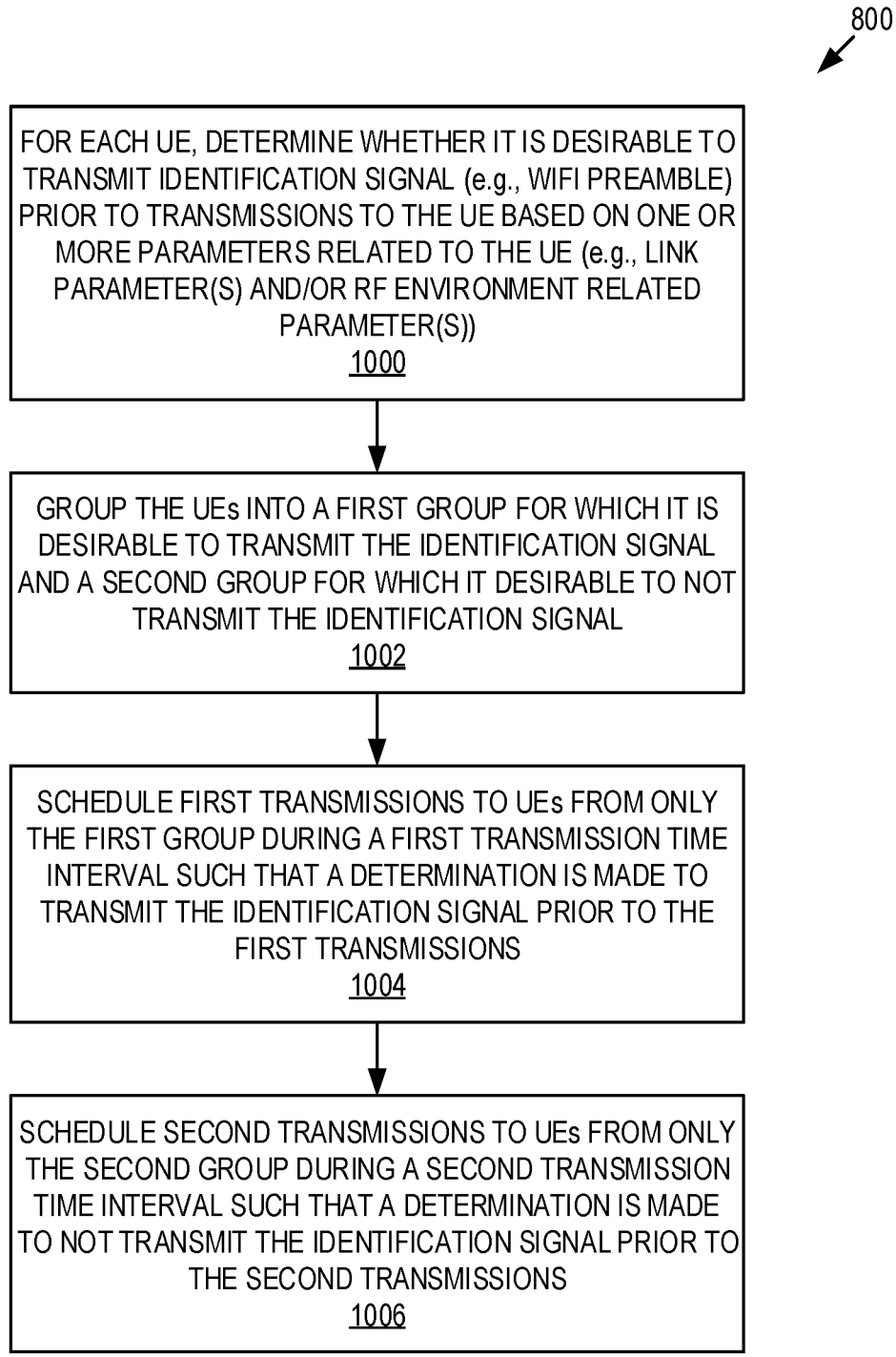
FIG. 10 illustrates another example of step 800 of FIG. 8.

FIGS. 8 through 10 are flow charts that illustrate the operation of a cellular base station such as, e.g., the base station 302 or the low power base station 306 of FIG. 3 that is operating in unlicensed spectrum in accordance with some embodiments of the present disclosure. Note that while these embodiments are described as being performed by the cellular base station, they are not limited thereto. Rather, these embodiments may be performed by any type of wireless access node operating in unlicensed spectrum.

FIG. 8 is a flow chart that illustrates the operation of a cellular base station in accordance with some embodiments of the present disclosure. Optional steps are represented by dashed lines. In this example, the cellular base station is a cellular base station, such as e.g. the base station 302 or the low power base station 306 of FIG. 3, that is operating in unlicensed spectrum. As illustrated, the cellular base station determines whether to transmit an identification signal and/or detect identification signals from other transmit nodes operating in the unlicensed spectrum based on one or more parameters (step 800). Note that the one or more parameters may include values assigned to those parameters. Alternatively, values may be assigned to the parameters, e.g., via a machine learning algorithm. By making the determination in step 800, the cellular base station is able to dynamically determine whether to transmit an identification signal prior to performing a LBT procedure to determine whether the channel is busy before transmitting a downlink transmission and/or dynamically determine whether to detect identification signals transmitted by other transmit nodes (e.g., WiFi APs, WiFi devices, other cellular base stations transmitting WiFi preambles, etc.) during its LBT procedure (e.g., as opposed to using energy detection to determine whether the channel is busy).

As discussed above, in many of the embodiments described herein, the identification signal(s) is(are) a WiFi preamble(s) or a portion of a WiFi preamble(s). When the identification signal(s) is(are) a WiFi preamble(s), the WiFi preamble(s) can be any type of WiFi preamble(s) such as, e.g., a non-HT or legacy WiFi preamble, a HT WiFi preamble, a HT-GF WiFi preamble, or the like. Thus, in step 800, the cellular base station determines whether to transmit/detect at least a portion of a WiFi preamble including a L-STF, a L-LTF, a L-SIG, a HT-SIG, a HT-STF, one or more HT-LTFs, a HT-GF-STF, a HT-LTF1, a HT-SIG, one or more HT-LTFs, a Very HT Short Training Field (VHT-STF), and/or the like.

In some embodiments, the one or more parameters used by the cellular base station to determine whether to transmit/detect the identification signal(s) are adjustable. Also, the parameters may each have an associated value (e.g., parameter X has value Y, i.e., parameter X=Y). Alternatively, the parameter(s) may have values that are configured, e.g., via a machine learning algorithm (e.g., a machine learning algorithm that determines what values of the parameters achieve the best result(s), e.g., highest user throughput). Further, in some embodiments, the one or more parameters include one or more link parameters and/or one or more parameters related to the RF environment sensed at the cellular base station and/or sensed by a respective wireless device (e.g., a UE 312). As discussed below in more detail, the one or more parameters are preferably wireless device (e.g., UE) specific. For example, the one or more parameters may include one or link parameters for a wireless link(s) between the cellular base station and a respective wireless device(s), where the wireless link can be an uplink and/or a downlink. As another example, the one or more parameters may include one or more parameters for a RF environment sensed by the cellular base station with respect to a respective wireless device and/or reported by a respective wireless device.

Some example link parameters include a wireless device configured uplink power for a respective wireless device, a threshold of a Reference Signal Received Quality (RSRQ) indicating a Bit Error Rate (BER) of a received signal at a respective wireless device from the cellular base station, and/or the like. For example, if BER is high thereby indicating poorly decoded transmissions due to interference, a decision can be made to start transmitting and/or detecting WiFi preambles in order to reduce interference and improve BER. RSRQ is one means to assess the BER and can therefore be a parameter used to decide whether or not to transmit/detect WiFi preambles. Some example parameters related to the RF environment sensed at the cellular base station and/or at the wireless device include: channel load computed based on RSSI measurements or RSRP measurements performed by the wireless device and reported to the cellular base station; SINR or Signal to Interference Ratio (SIR) reported by the wireless device to the wireless AP for the wireless link between the wireless AP and the wireless device; HARQ retransmission ratio of transmissions between the wireless AP and the wireless device (e.g., either in the uplink or downlink) where the HARQ retransmission ratio can be expressed as the number of unsuccessfully decoded transport blocks over the number of successfully decoded transport blocks during some (short) time period; CQI reported to the cellular base station by the wireless device; a noise floor (i.e., estimate of channel noise when there are no interferers); a Clear Channel Assessment (CCA) (also referred to as LBT) success ratio; and/or an estimated number of unique transmitting nodes for which the identification signals can be detected by the cellular base station. In regard to channel load, the channel load (also referred to as channel utilization or channel busyness) is the channel occupancy due to transmissions that are detected at or above a detection threshold, e.g., CCA-PD (Clear Channel Assessment-Preamble Detection) or CCA-ED (Clear Channel Assessment-Energy Detection), e.g., in IEEE 802.11 or 3GPP (in unlicensed spectrum).

The cellular base station operates in accordance with the determination made in step 800 (step 802). For instance, if the cellular base station determines that it is not to transmit a WiFi preamble, the cellular base station refrains from transmitting a WiFi preamble, e.g., prior to performing a LBT procedure to determine whether the channel is clear for a downlink transmission. Conversely, if the cellular base station determines that it is to transmit a WiFi preamble, the cellular base station transmits a WiFi preamble, e.g., prior to performing a LBT procedure to determine whether the channel is clear for a downlink transmission. As another example, if the cellular base station determines that it is not to detect WiFi preambles from other transmit nodes, the cellular base station refrains from detecting WiFi preambles transmitted by other transmit nodes, e.g., when performing a LBT procedure to determine whether the channel is clear for a downlink transmission. Conversely, if the cellular base station determines that it is to detect WiFi preambles from other transmit nodes, the cellular base station detects WiFi preambles transmitted by other transmit nodes, e.g., when performing a LBT procedure to determine whether the channel is clear for a downlink transmission.

Optionally, if in step 800 the cellular base station determines that it is not to transmit an identification signal (e.g., a WiFi preamble), the cellular base station sends an indication to a wireless device(s) served by the base station to inform the wireless device(s) to also not transmit identification signals (e.g., WiFi preambles) (step 804). The UE(s) will then not transmit an identification signal, e.g., prior to performing its LBT procedure prior to performing an uplink transmission. While not illustrated, in the same manner, if in step 800 the cellular base station determines that it is not to detect identification signals (e.g., WiFi preambles) transmitted by other transmit nodes, the cellular base station sends an indication to a wireless device(s) served by the base station to inform the wireless device(s) to also not detect identification signals (e.g., WiFi preambles) from other transmit nodes. The wireless device(s) will then not detect identification signals transmitted by other transmit nodes, e.g., when performing its LBT procedure prior to performing an uplink transmission. In other words, the wireless device(s) will perform its LBT procedure based on energy detection rather than carrier sensing.

Optionally, the cellular base station repeats steps 800, 802, and optionally 804 for one or more additional time periods (step 806). In other words, steps 800, 802, and optionally step 804 may be performed for a first time period and then repeated for one or more additional time periods. In this manner, the cellular base station dynamically enables or disables transmission of an identification signal (e.g., a WiFi preamble) and/or dynamically enables or disables detection of identification signals (e.g., WiFi preambles) transmitted by other transmit nodes based on the one or more parameters.

As discussed above, the one or more parameters are, in some embodiments, wireless device specific. In this regard, FIG. 9 illustrates one example of step 800 in which the cellular base station utilizes wireless device specific parameters to determine whether to transmit and/or detect identification signals (e.g., WiFi preambles). In this embodiment, the cellular base station determines, for each wireless device, whether it is desirable to transmit an identification signal (e.g., WiFi preamble) prior to transmissions to the wireless device based on one or more wireless device specific parameters for the UE (step 900). As discussed above, the wireless device specific parameters include one or more link parameters and/or one or more parameters related to the RF environment sensed at the wireless device and/or at the cellular base station.

The cellular base station also schedules a subset of the wireless devices for an upcoming transmit time interval (step 902). Note that, in one alternative embodiment, the cellular base station first schedules the wireless devices for the upcoming transmit time interval and performs the determination of step 900 for each scheduled wireless device. Any scheduling scheme may be used.

The cellular base station then determines whether to transmit the identification signal (e.g., WiFi preamble) and/or detect identification signals (e.g., WiFi preambles) from other transmit nodes based on the result of step 900 for the scheduled wireless devices (step 904). For example, the cellular base station may determine that it is not to transmit a WiFi preamble prior to downlink transmissions to the scheduled wireless devices in the upcoming transmit time interval if, in step 900, it determined that transmission of a WiFi preamble is not desirable for all of the scheduled wireless devices. Conversely, the cellular base station may determine that it is to transmit a WiFi preamble prior to downlink transmissions to the scheduled wireless devices in the upcoming transmit time interval if, in step 900, it determined that transmission of a WiFi preamble is desirable for any one or more of the scheduled wireless devices. As another example, the cellular base station may determine that it is not to detect WiFi preambles prior to downlink transmissions to the scheduled wireless devices in the upcoming transmit time interval if, in step 900, it determined that detection of WiFi preambles is not desirable for all of the scheduled wireless devices. Conversely, the cellular base station may determine that it is to detect WiFi preambles prior to downlink transmissions to the scheduled wireless devices in the upcoming transmit time interval if, in step 900, it determined that detection of WiFi preambles is desirable for any one or more of the scheduled wireless devices.

FIG. 10 illustrates one example of step 800 in which the cellular base station utilizes wireless device specific parameters to schedule similar wireless devices for transmission in a transmit time interval in accordance with some other embodiments of the present disclosure. In this embodiment, the cellular base station determines, for each wireless device, whether it is desirable to transmit an identification signal (e.g., WiFi preamble) prior to transmissions to the wireless device based on one or more wireless device specific parameters for the wireless device (step 1000). As discussed above, the wireless device specific parameters include one or more link parameters and/or one or more parameters related to the RF environment sensed at the wireless device and/or at the cellular base station.

The cellular base station groups the wireless devices into a first group for which it is desirable to transmit identification signals and a second group for which it is desirable to not transmit identification signals (step 1002). The cellular base station schedules first transmissions to wireless devices from only the first group during a first transmission time interval such that a determination is made to transmit the identification signal prior to the first transmissions, e.g., prior to performing an LBT procedure to determine whether the channel is clear prior to transmitting the first transmissions in the first transmit time interval (step 1004). The cellular base station schedules second transmissions to wireless devices from only the second group during a second transmission time interval such that a determination is made to not transmit the identification signal prior to the second transmissions, e.g., prior to performing an LBT procedure to determine whether the channel is clear prior to transmitting the second transmissions in the second transmit time interval (step 1006). Note that the terms "first" and "second" as used here with respect to steps 1004 and 1006 are not intended to convey any required timing relationship between the first and second transmission and the first and second transmit time intervals. For instance, the first transmit time interval (and thus the first transmissions) may occur before or after the second transmit time interval (and thus the second transmissions).

Figure 11:
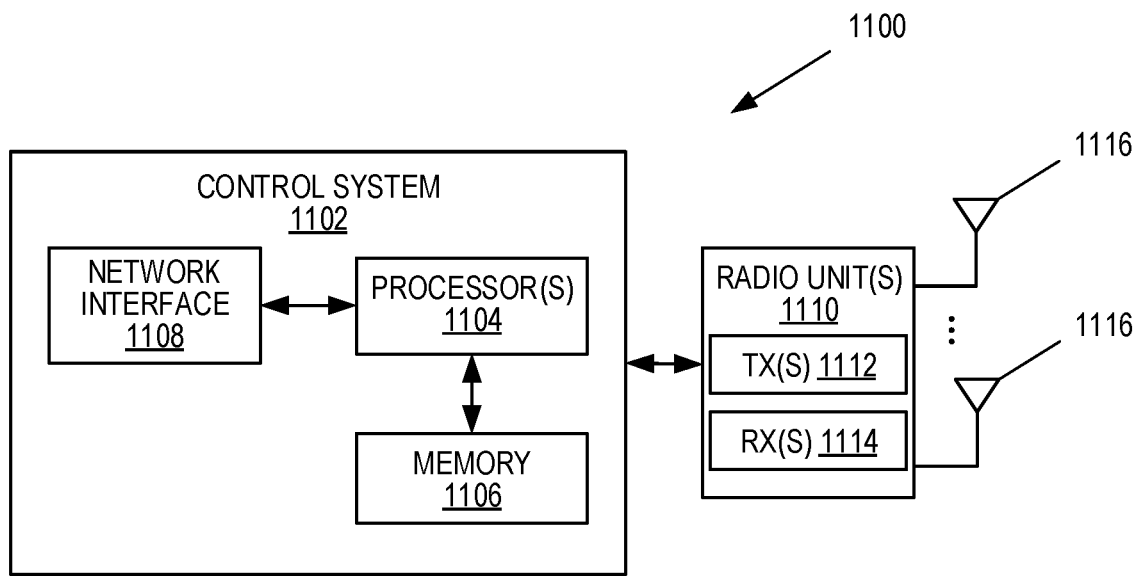
FIG. 11 is a schematic block diagram of a wireless access point (e.g., a radio access node) according to some embodiments of the present disclosure.

FIG. 11 is a schematic block diagram of a wireless access point 1100 according to some embodiments of the present disclosure. The wireless access point 1100 may be, for example, the base station 302 or 306. As illustrated, the wireless access point 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the wireless access point 1100 includes one or more radio units 1110 that each includes one or more transmitters 1112 and one or more receivers 1114 coupled to one or more antennas 1116. The radio units 1110 may be referred to or be part of radio interface circuitry. In some embodiments, the radio units 1110 include separate radio units for different radio access technologies such as, e.g., a first radio unit for cellular access and a second radio unit for non-cellular access (e.g., WiFi). In this case, the second radio unit can be used to dynamically transmit and/or detect identification signals as described herein. In some other embodiments, the radio units 1110 include a radio unit for both cellular access and transmission and/or detection of identification signals as described herein. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a wireless access point 1100 as described herein (e.g., with respect to FIGS. 8 through 10). In some embodiments, the function(s)

are implemented in software that is stored, e.g., in the memory 1106 and executed by the one or more processors 1104.

Figure 12:
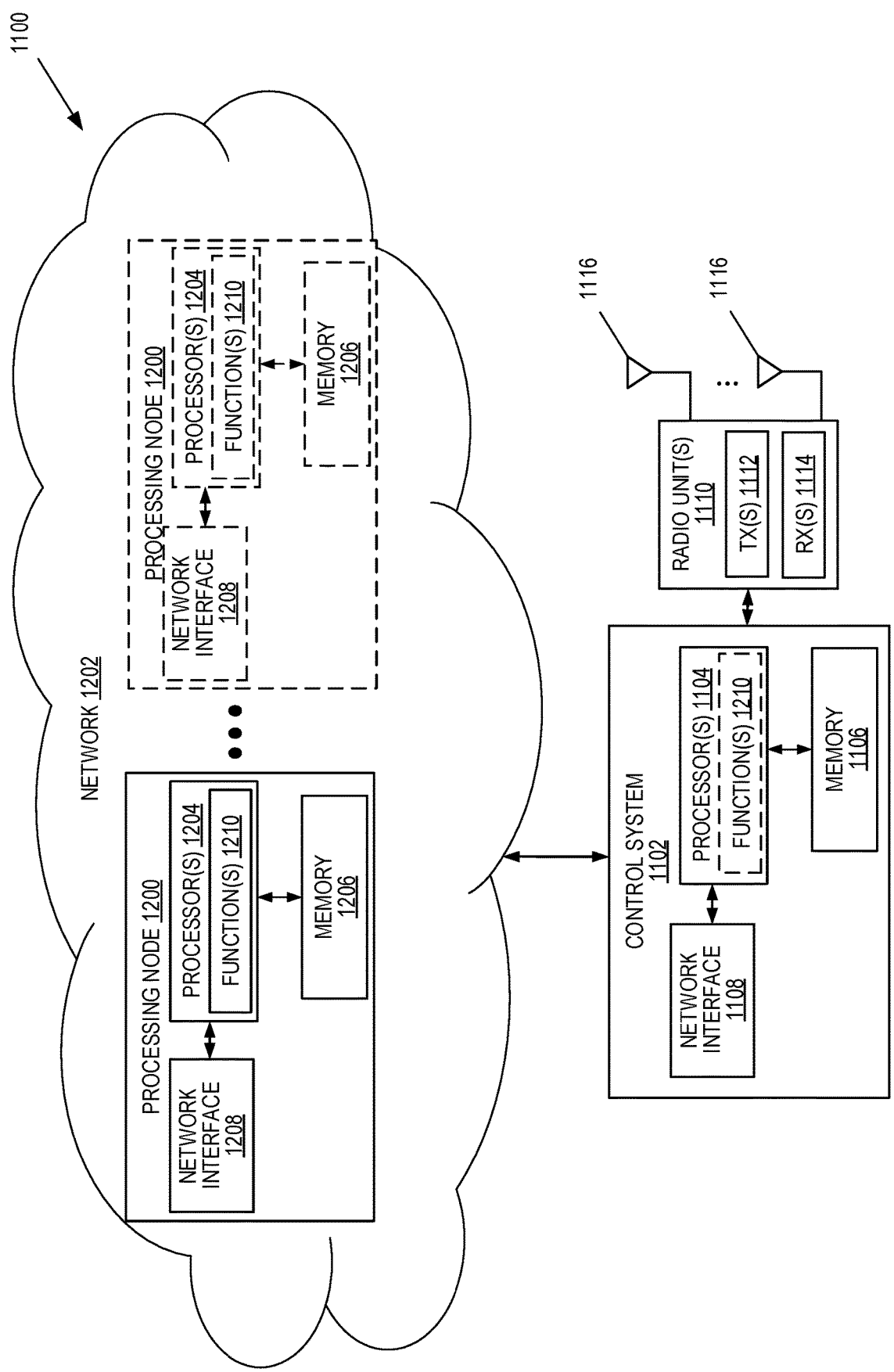
FIG. 12 is a schematic block diagram that illustrates a virtualized embodiment of the wireless access point of FIG. 11 according to some embodiments of the present disclosure.

FIG. 12 is a schematic block diagram that illustrates a virtualized embodiment of the wireless access point 1100 according to some embodiments of the present disclosure. This discussion is equally applicable to other types of network nodes. Further, other types of network nodes may have similar virtualized architectures.

As used herein, a "virtualized" wireless access point is an implementation of the wireless access point 1100 in which at least a portion of the functionality of the wireless access point 1100 is implemented as a virtual component(s) (e.g., via a virtual machine(s) executing on a physical processing node(s) in a network(s)). As illustrated, in this example, the wireless access point 1100 includes the control system 1102 that includes the one or more processors 1104 (e.g., CPUs, ASICs, FPGAs, and/or the like), the memory 1106, and the network interface 1108 and the one or more radio units 1110 that each includes the one or more transmitters 1112 and the one or more receivers 1114 coupled to the one or more antennas 1116, as described above. The control system 1102 is connected to the radio unit(s) 1110 via, for example, an optical cable or the like. The control system 1102 is connected to one or more processing nodes 1200 coupled to or included as part of a network(s) 1202 via the network interface 1108. Each processing node 1200 includes one or more processors 1204 (e.g., CPUs, ASICs, FPGAs, and/or the like), memory 1206, and a network interface 1208.

In this example, functions 1210 of the wireless access point 1100 described herein (e.g., with respect to FIGS. 8 through 10) are implemented at the one or more processing nodes 1200 or distributed across the control system 1102 and the one or more processing nodes 1200 in any desired manner. In some particular embodiments, some or all of the functions 1210 of the wireless access point 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of the wireless access point 1100 or a node (e.g., a processing node 1200) implementing one or more of the functions 1210 of the wireless access point 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
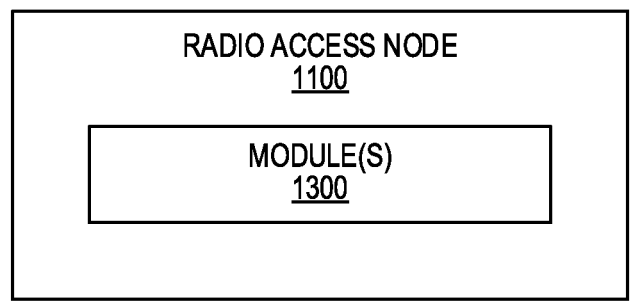
FIG. 13 is a schematic block diagram of the wireless access point of FIG. 11 according to some other embodiments of the present disclosure.

FIG. 13 is a schematic block diagram of the wireless access point 1100 according to some other embodiments of the present disclosure. The wireless access point 1100 includes one or more modules 1300, each of which is implemented in software. The module(s) 1300 provide the functionality of the wireless access point 1100 described herein (e.g., with respect to FIGS. 8 through 10). This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
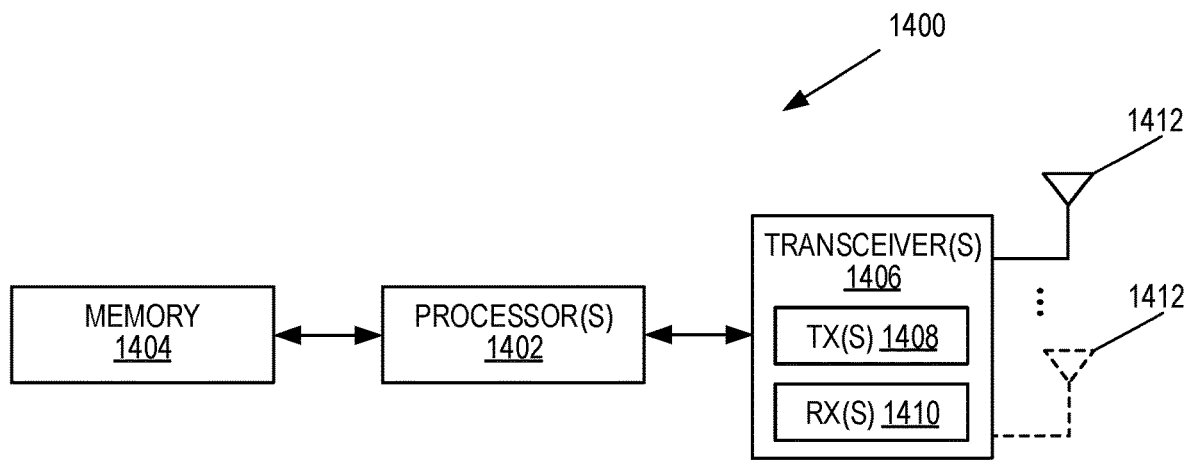
FIG. 14 is a schematic block diagram of a User Equipment device (UE) according to some embodiments of the present disclosure.

FIG. 14 is a schematic block diagram of a wireless device 1400 (e.g., UE) according to some embodiments of the present disclosure. As illustrated, the wireless device 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the wireless device 1400 described above may be fully or partially implemented in software that is, e.g., stored in the memory 1404 and executed by the processor(s) 1402. Note that the wireless device 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the wireless device 1400 and/or allowing output of information from the wireless device 1400), a power supply (e.g., a battery and associated power circuitry), etc.

In some embodiments, a computer program including instructions which, when executed by at least one processor, causes the at least one processor to carry out the functionality of the wireless device 1400 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
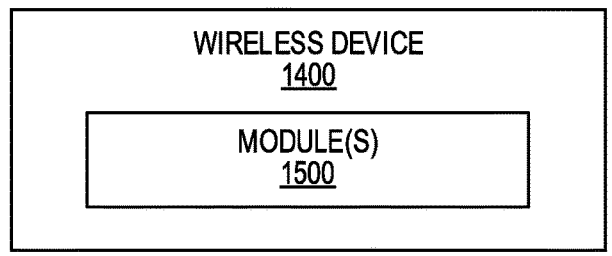
FIG. 15 is a schematic block diagram of the UE of FIG. 14 according to some other embodiments of the present disclosure.

FIG. 15 is a schematic block diagram of the wireless device 1400 according to some other embodiments of the present disclosure. The wireless device 1400 includes one or more modules 1500, each of which is implemented in software. The module(s) 1500 provide the functionality of the wireless device 1400 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

μs Microsecond
3GPP Third Generation Partnership Project
5G Fifth Generation
5GS Fifth Generation System
ACK Acknowledgement
AGC Automatic Gain Control
AP Access Point
ASIC Application Specific Integrated Circuit
BER Bit Error Rate
BPSK Binary Phase Shift Keying
BTS Base Transceiver Station
BW Bandwidth
CCA Clear Channel Assessment
CCA-ED Clear Channel Assessment-Energy Detection
CCA-PD Clear Channel Assessment-Preamble Detection
CPU Central Processing Unit
CQI Channel Quality Indication
dB Decibel
dBi Decibels Relative to Isotropic
dBm Decibel-Milliwatt
DRS Demodulation Reference Signal
DSP Digital Signal Processor
eNB Enhanced or Evolved Node B
ETSI European Telecommunications Standards Institute
FPGA Field Programmable Gate Array
GHz Gigahertz
GI Global Identifier
gNB New Radio Base Station
HARQ Hybrid Automatic Repeat Request
HT High Throughput
HT-GF High Throughput Greenfield
HT-GF-STF High Throughput Greenfield Short Training Field
HT-LTF High Throughput Long Training Field
HT-LTF1 High-Throughput Long Training Field 1
HT-SIG High Throughput Signaling Field
HT-STF High Throughput Short Training Field
LAA License Assisted Access
LBT Listen-Before-Talk
L-LTF Legacy Long Training Field
LoS Line of Sight
L-SIG Legacy Signaling Field
L-STF Legacy Short Training Field
LTE Long Term Evolution
m Meter
MHz Megahertz
ms Millisecond
MTC Machine Type Communication
NACK Negative Acknowledgement
NR New Radio
NR-U New Radio Unlicensed
OFDM Orthogonal Frequency Division Multiplexing
OTT Over-the-Top
PLCP Physical Layer Convergence Procedure
PPDU Physical Layer Convergence Procedure Protocol Data Unit
PUCCH Physical Uplink Control Channel
PUSCH Physical Uplink Shared Channel
RAM Random Access Memory
RAN Radio Access Network
Rel Release
RF Radio Frequency
RMS Root Mean Square
ROM Read Only Memory
RRH Remote Radio Head
RSRP Received Signal Reference Power
RSRQ Reference Signal Received Quality
RSSI Received Signal Strength Indicator
SINR Signal to Interference plus Noise Ratio
SIR Signal to Interference Ratio
STA Station
TXOP Transmission Opportunity
UE User Equipment
UTRAN Universal Terrestrial Radio Access Network
VHT-STF Very High Throughput Short Training Field
WLAN Wireless Local Area Network Those skilled in the art will recognize improvements and modifications to the embodiments of the present disclosure. All such improvements and modifications are considered within the scope of the concepts disclosed herein.

What is claimed is:

1. A method in a wireless access node that operates in an unlicensed frequency spectrum, comprising:
   determining, based on one or more parameters, whether the wireless access node is to transmit an identification signal and/or detect identification signals from other transmit nodes; and
   operating in accordance with a result of the determining, wherein the one or more parameters comprise one or more link parameters for a wireless link between the wireless access node and another wireless access node.

2. The method of claim 1, wherein the identification signal comprises at least a portion of a WiFi preamble.

3. The method of claim 2, wherein the WiFi preamble is:
   a WiFi preamble for a non-High Throughput (HT), Physical Layer Convergence Procedure (PLCP), Protocol Data Unit (PPDU), wherein the WiFi preamble comprises Legacy Short Training Field (L-STF), Legacy Long Training Field (L-LTF), and Legacy Signaling Field (L-SIG);
   a WiFi preamble for a HT-mixed format PPDU, wherein the WiFi preamble comprises L-STF, L-LTF, L-SIG, HT Signaling Field (HT-SIG), HT Short Training Field (HT-STF), and one or more HT Long Training Fields (HT-LTFs);
   a WiFi preamble for a Greenfield format PPDU, wherein the WiFi preamble comprises a HT Greenfield Short Training Field (HT-GF-STF), a HT-LFT1, a HT-SIG, and one or more HT-LTFs; or
   a WiFi preamble comprising a Very HT Short Training Field (VHT-STF).

4. The method of claim 2, wherein the at least a portion of the WiFi preamble comprises:
   a Legacy Short Training Field (L-STF);
   a Legacy Long Training Field (L-LTF);
   a Legacy Signaling Field (L-SIG);
   a High Throughput Signaling Field (HT-SIG);
   a HT Short Training Field (HT-STF);
   one or more HT Long Training Fields (HT-LTFs);
   a HT Greenfield Short Training Field (HT-GF-STF);

a HT-LFT1 field; and/or a Very HT Short Training Field (VHT-STF).

5. The method of claim 1, wherein the one or more parameters are adjustable.

6. The method of claim 1, wherein the wireless access node is a cellular base station, the other wireless access node is a User Equipment (UE) served by the cellular base station, and the one or more link parameters comprise a UE configured uplink power for the UE.

7. The method of claim 1, wherein the one or more link parameters comprise a configured transmit power for the wireless access node or the other wireless access node for the wireless link.

8. The method of claim 1, wherein the one or more link parameters comprise a threshold of a Reference Signal Received Quality (RSRQ) indicating a Bit Error Rate (BER) of a received signal at the other wireless access node from the wireless access node.

9. The method of claim 1, wherein the one or more parameters comprise one or more parameters related to a radio frequency channel environment sensed by the wireless access node or another wireless access node that wirelessly communicates with the wireless access node.

10. The method of claim 9, wherein the one or more parameters related to the radio frequency channel environment comprise:

channel load;

Signal to Interference plus Noise Ratio (SINR) or Signal to Interference Ratio (SIR) reported by the other wireless access node to the wireless access node for a wireless link between the wireless access node and the other wireless access node;

Hybrid Automatic Repeat Request (HARQ) retransmission ratio of transmissions;

Channel Quality Indication (CQI);

a noise floor;

a Clear Channel Assessment (CCA) success ratio; and/or an estimated number of unique transmitting nodes for which the identification signals can be detected by the wireless access node.

11. The method of claim 10, wherein the channel load is computed based on Received Signal Strength Indicator (RSSI) measurements or Received Signal Reference Power (RSRP) measurements performed by the other wireless access node and reported to the wireless access node.

12. The method of claim 1, wherein:

determining whether the wireless access node is to transmit the identification signal and/or detect the identification signals from the other transmit nodes comprises determining, based on the one or more parameters, whether the wireless access node is to transmit the identification signal during a first time period and/or detect the identification signals from the other transmit nodes during the first time period; and operating in accordance with the result of the determining comprises operating in accordance with the result of the determining during the first time period;

wherein the method further comprises:

determining, based on the one or more parameters, whether the wireless access node is to transmit the identification signal during a second time period and/or detect the identification signals from the other transmit nodes during the second time period; and during the second time period, operating in accordance with a result of the determining whether the wireless access node is to transmit the identification signal during the second time period and/or detect the identification signals from the other transmit nodes during the second time period.

13. The method of claim 1, wherein determining whether the wireless access node is to transmit the identification signal and/or detect the identification signals from the other transmit nodes comprises determining whether the wireless access node is to transmit the identification signal based on the one or more parameters.

14. The method of claim 13, wherein:

determining whether the wireless access node is to transmit the identification signal based on the one or more parameters comprises determining that the wireless access node is not to transmit the identification signal based on the one or more parameters.

15. The method of claim 14, wherein operating in accordance with the result of the determining comprises refraining from transmitting the identification signal upon determining that the wireless access node is not to transmit the identification signal based on the one or more parameters.

16. The method of claim 13, wherein the wireless access node is a wireless access point, and:

determining whether the wireless access node is to transmit the identification signal based on the one or more parameters comprises:

determining, for each wireless device of a plurality of wireless devices served by the wireless access point, whether it is desirable for the wireless access point to transmit the identification signal prior to transmissions to the wireless device based on one or more parameters related to the wireless device;

for a transmit time interval during which transmissions to a subset of the plurality of wireless devices are scheduled to be transmitted:

determining to not transmit the identification signal prior to transmitting the transmissions to the subset of the plurality of wireless devices if it has been determined that it is desirable for the wireless access point to not transmit the identification signal prior to transmissions to all wireless devices in the subset; and determining to transmit the identification signal prior to transmitting the transmissions to the subset of the plurality of wireless devices if it has been determined that it is desirable for the wireless access point to transmit the identification signal prior to transmissions to any wireless device in the subset.

17. The method of claim 13, wherein the wireless access node is a wireless access point, and:

determining whether the wireless access point is to transmit the identification signal based on the one or more parameters comprises:

determining, for each wireless device of a plurality of wireless devices served by the wireless access point, whether it is desirable for the wireless access point to transmit the identification signal prior to transmissions to the wireless device based on one or more parameters related to the wireless device;

grouping the plurality of wireless devices into a first group for which it is desirable to transmit the identification signal and a second group for which it is desirable not to transmit the identification signal;

scheduling first transmissions to wireless devices from only the first group during a first transmission time interval such that a determination is made to transmit the identification signal prior to the first transmissions; and scheduling second transmissions to wireless devices from only the second group during a second transmission time interval such that a determination is made to not transmit the identification signal prior to the second transmissions.

18. The method of claim 1, wherein determining whether the wireless access node is to transmit the identification signal and/or detect the identification signals from the other transmit nodes comprises determining whether the wireless access node is to detect the identification signals from the other transmit nodes based on the one or more parameters.

19. The method of claim 18, wherein:
determining whether the wireless access node is to detect the identification signals from the other transmit nodes based on the one or more parameters comprises determining that the wireless access node is not to detect the identification signals from the other transmit nodes based on the one or more parameters.

20. The method of claim 1, wherein the wireless access node is a cellular base station.

21. The method of claim 20, wherein the cellular base station is a Third Generation Partnership Project (3GPP) base station.

22. The method of claim 20, further comprising:
sending, to a wireless device, an indication that the wireless device is not to transmit the identification signal prior to at least one subsequent transmission by the wireless device.

23. The method of claim 1, wherein the wireless access node is a WiFi access point.

24. A wireless access node configured to operate in an unlicensed frequency spectrum, comprising:
at least one radio unit; and
processing circuitry associated with the at least one radio unit, the processing circuitry configured to cause the wireless access node to:
determine, based on one or more parameters, whether the wireless access node is to transmit an identification signal and/or detect identification signals from other transmit nodes; and
operate in accordance with a result of the determining, wherein the one or more parameters comprise one or more link parameters for a wireless link between the wireless access node and another wireless access node.

* * * * *